(No Model.)
G. D. HAWORTH.
SEED PLANTER.
No. 277,031. Patented May 8, 1883.
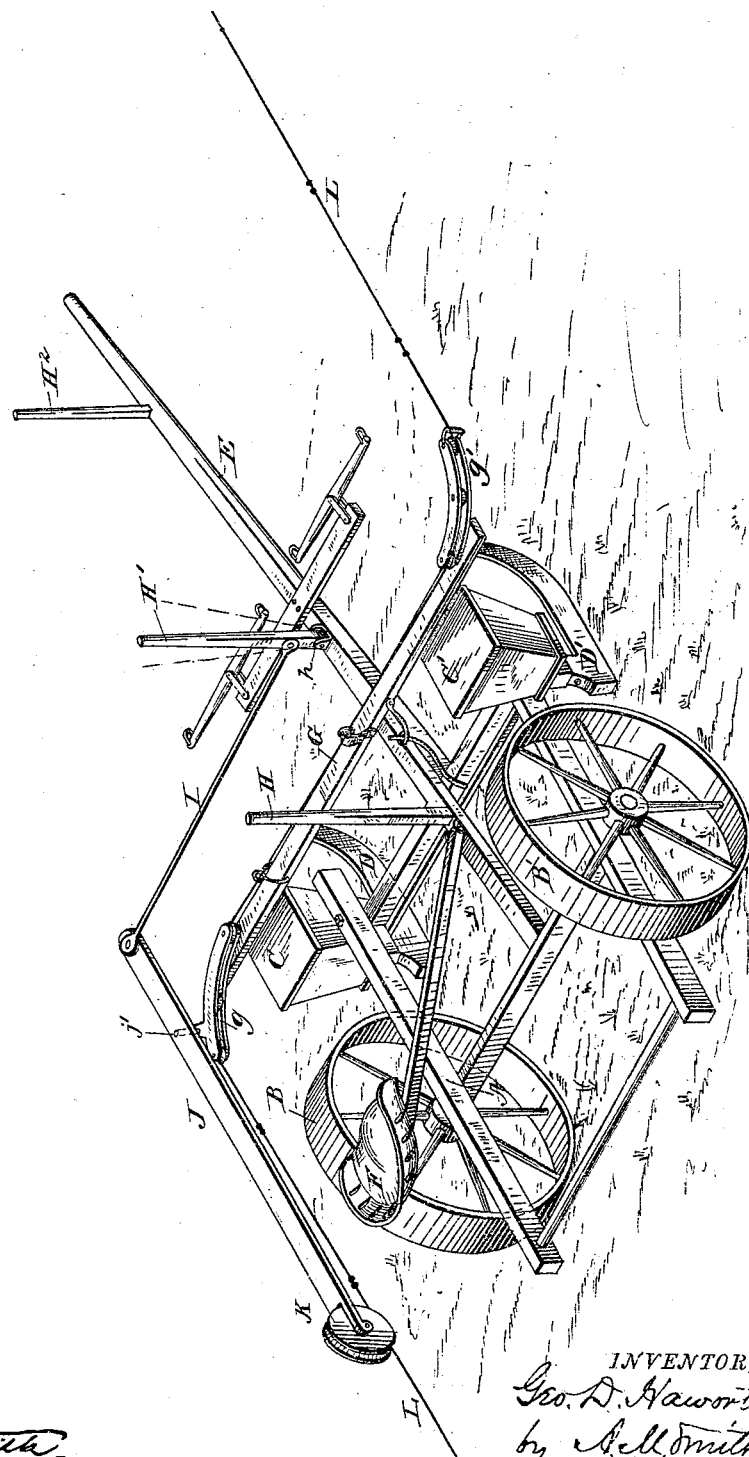
WITNESSES
F. L. Durand.
Rex Smith
INVENTOR.
Geo. D. Haworth.
by A. M. Smith,
Attorney.

UNITED STATES PATENT OFFICE.

GEORGE D. HAWORTH, OF DECATUR, ILLINOIS.

SEED-PLANTER.

SPECIFICATION forming part of Letters Patent No. 277,031, dated May 8, 1883.

Application filed January 9, 1883. (No model.)

*To all whom it may concern:*

Be it known that I, GEORGE D. HAWORTH, of Decatur, county of Macon, and State of Illinois, have invented a new and useful Improvement in Seed-Planters, of which the following is a full, clear, and exact description, reference being had to the accompanying drawing, making part of this specification.

My invention relates to means for enabling the driver to guide the team and machine in right lines, in their movements back and forth across the field being planted, for causing the same to be planted in straight and parallel lines, thereby avoiding waste of ground or undue crowding of the rows, while at the same time improving the appearance and facilitating the subsequent cultivation of the crop; and it consists in providing the machine with "sights," one of which is movable, and the position of which relative to the other sight or sights is controlled by the relation of the machine to the check-line actuating the seeding devices, as hereinafter explained.

The accompanying drawing represents in perspective a check-row corn-planter with my improvements applied.

The machine proper and the check-row attachment thereto may be of any usual or preferred form or construction, such as are now in use, and these need not therefore be described in detail further than is necessary to show the application of my improvements thereto.

A represents the frame of the machine, B B' the main carrying and covering wheels, C C' the seed-hoppers, D D' the runners or furrow-openers, E the pole or tongue, F the driver's seat, and G the main transverse bar of the check-row attachment, said parts being of any usual or preferred construction and arrangement.

The bar G is provided at its ends with curved and swiveling check-line guides $g$ $g'$, having each a series of grooved pulleys, over or partially around which the check-line L passes in being taken up from the ground on one side, transferred across the machine, and laid down upon the ground again upon the opposite side of the machine, in a manner well understood by those familiar with this class of machines.

Upon the frame of the machine, immediately in front of the driver's seat support, is secured an upright rod, H, and upon the forward end of the pole or tongue is secured another upright rod, $H^2$, said parts forming what I term "fixed sights" for guiding the movements of the machine and team, and between these, and in the same longitudinal plane, is a third upright rod, H', pivoted at its lower end in lugs or ears $h$, attached to the tongue at or near its rear end, or to some other convenient point of support.

To this intermediate pivoted sight, H, just above its pivotal connection with its support, is attached one end of a connecting-rod, I, the outer end of which is connected with the forward arm of a lever, J, mounted on an upright pivotal pin, $j$, on a lug or ear formed on the check-line guide $g$, said lever being arranged in line parallel with and directly over the portion of the check-line passing from the guide $g$ to the ground. The rear end of this lever J is forked and provided with bearings for the horizontal shaft of a grooved sheave or roller, K, which, being connected with the longer and heavier arm of the lever J, rests and rolls on the check-line L as the latter is being paid out, after having acted on the seeding devices.

The operation will be readily understood. When the machine is moving across the field in a right line the upper end of the rods H, H', and $H^2$, with the parts above described properly constructed and adjusted, will be in range or in line one with the others; but any deflection from a right line of movement will cause the check-line to act through the grooved roller K on the lever J, and the latter, acting through the rod I on the pivoted intermediate sight, will vibrate the latter to one side or the other, according to the direction of variation of the team from a right line, and out of range of line with the fixed sights H and $H^2$, as indicated by dotted lines in the drawing, and said sights being arranged directly in front of the driver in his seat, such vibration of the sight H' and variation from a right line will be immediately detected, and can be remedied by the driver by proper guidance of the team.

The form and arrangement of the sights may be varied. For example, the end of the pole or tongue of the machine may be utilized to serve the purpose of the sight $H^2$, and the latter dispensed with, if desired. In most cases this end of the pole or tongue will be found a sufficient guide in connection with the movable sight or indicator. Other variations may be made to suit the wishes of the user or the fancy of the manufacturer, and they can be adapted to be operated by the check-line as it is being taken up, instead of being paid out; but the arrangement described is the preferred one.

Having now described my invention, what I claim as new is—

1. In a seed-planter, a movable sight for facilitating the guidance of the machine, in combination with means for automatically vibrating said sight, substantially as and for the purpose described.

2. In a seed-planter, a movable sight for guiding the machine, combined with and actuated by the check-line, substantially as described.

3. In a seed-planter, a fixed sight, in combination with a movable sight for guiding the movements of the machine, and means for automatically vibrating said movable sight, substantially as described.

4. The combination, with a seed-planter, of two or more sights, one of which is movable and adapted to be vibrated automatically through connection with the check-line, substantially as described.

5. The combination, with a seed-planter, of the fixed sights H and H², the movable sight H′, and means whereby the latter is adapted to be connected with and automatically vibrated by the check-line, substantially as described.

6. The combination, with a seed-planter, of fixed and movable sights and a lever provided with a grooved roller, said lever being connected with the movable sight for actuating it, substantially as described.

In testimony whereof I have hereunto set my hand this 6th day of January, A. D. 1883.

GEORGE D. HAWORTH.

Witnesses:
THEO. COLEMAN,
WM. E. HAWORTH.